United States Patent [19]

Feldgajer

[11] Patent Number: 4,932,065

[45] Date of Patent: Jun. 5, 1990

[54] UNIVERSAL CHARACTER SEGMENTATION SCHEME FOR MULTIFONT OCR IMAGES

[75] Inventor: Oleg Feldgajer, Waterloo, Canada

[73] Assignee: NCR Corporation, Dayton, Ohio

[21] Appl. No.: 271,982

[22] Filed: Nov. 16, 1988

[51] Int. Cl.$^5$ .............................................. G06K 9/34
[52] U.S. Cl. .......................................... 382/9; 382/14; 382/15
[58] Field of Search ................................ 382/9, 14, 15

[56] References Cited

U.S. PATENT DOCUMENTS

| | | | |
|---|---|---|---|
| 3,519,990 | 7/1970 | Holt et al. | 382/9 |
| 3,609,686 | 9/1971 | Savory et al. | 382/14 |
| 4,562,594 | 12/1985 | Bednar et al. | 382/9 |
| 4,680,803 | 7/1987 | Dilella | 382/9 |

Primary Examiner—Leo H. Boudreau
Assistant Examiner—Daniel Santos
Attorney, Agent, or Firm—Wilbert Hawk, Jr.; Albert L. Sessler, Jr.; Elmer Wargo

[57] ABSTRACT

The method comprises: selecting an examination window whose size covers the image data associated with a character within a set of characters; presenting image data for a known character to the examination window to obtain a probability density function (PDF) for each pixel within the examining window for each character in the set of characters to be found or segmented to generate a composite PDF for each pixel within the examining window; and using the composite PDF to determine when the examining window is positioned over image data associated with a character within the character set.

13 Claims, 7 Drawing Sheets

| | IN IDEAL ENVIRONMENT | | | |
|---|---|---|---|---|
| | START ROW | STOP ROW | START COLUMN | STOP COLUMN |
| FIELD #1 | 8 | 28 | 20 | 120 |
| FIELD #2 | 4 | 22 | 200 | 600 |

68

| | IN NOISY ENVIRONMENT | | | | | |
|---|---|---|---|---|---|---|
| | START ROW | STOP ROW | START ROW | STOP ROW | START COLUMN | STOP COLUMN |
| FIELD #1 | 1 | 2 | 8 | 28 | 20 | 120 |
| FIELD #2 | | | | | | |

82

UNIVERSAL CHARACTER SEGMENTATION SCHEME FOR MULTIFONT OCR IMAGES

BACKGROUND OF THE INVENTION (1) Field of the Invention. This invention relates to a process for finding and segmenting pixel data associated with a character from a matrix of pixel data in a multifont optical image system so as to enable the pixel data associated with a character to be singled out for use in subsequent operations, like character recognition techniques, for example.

(2) Description of Related Art. In recent years, there has been a trend to generate images of documents, and to use the images of the documents, where possible, in processing the information about the documents. For example, documents, like checks and deposit slips, may be imaged by moving the documents past a scanner which scans each document and produces a matrix of "pixel" data about each document. A pixel or pel is defined as a picture element which corresponds to a small area of the document being scanned. For example, there may be about 600 or 900 pixels in each scan line or column generated by the scanner. As the document is moved past the scanner during imaging, the scanner generates successive scan lines of pixels to produce a matrix of pixels for each document.

The matrix of pixels from the scanner is processed by thresholding, for example, to reduce each pixel to a binary "1" or a binary "0", with the binary 1 representing the presence of data and a binary 0 representing the absence of data. By this technique, a matrix of pixels is obtained for each document, with the matrix of pixels corresponding to the image of the document. The matrix of pixels associated with a document may be stored in a RAM or displayed on a CRT, for example, to be viewed by an operator when performing data completion in a financial environment, for example.

The matrix of pixels associated with a document contains image data about that document as previously mentioned. When the documents being processed are financial documents, like checks, for example, there are certain fields on the checks which are read by machines. The fields to be read contain character data which is printed in certain fonts, like E13B and CMC7, for example. With a resolution of about 200 pixels per inch at the scan line, for example, it is possible to machine read the characters in the fields by optical character recognition techniques when using the matrix of pixels.

A problem with working with a matrix of pixels is that it is generally difficult to find the fields containing the characters to be read, especially when the fields may be located in different places or areas on the documents from which the image data was obtained. Another problem is that after the field containing the characters is found, it is necessary to segment the matrix of pixels in that particular field in order to separate the pixels associated with one character from the remaining characters in the field. As the pixels associated with each character are segmented from the associated field, they may be subjected to character recognition techniques. Such techniques may include, for example, back propagation neural networks or other networks which may be used for character recognition.

SUMMARY OF THE INVENTION

An advantage of the present invention is that it facilitates the location of fields of characters within a matrix of pixels associated with an image of a document.

Another advantage relates to a process for segmenting pixels associated with a character from the matrix of pixels so as to facilitate character recognition.

When this invention is used in a processing system which presents a matrix of image data, with the matrix comprising rows and columns of binary pixels associated with a document having at least one field of characters thereon, it provides a method of finding the binary pixels associated with a character included in said field, with the method comprising the steps:

(a) selecting an examining window whose size covers a predetermined number of rows and columns of the pixels associated with a character in the image data;

(b) calculating a probability density function, hereinafter referred to as PDF, for each pixel within the examining window for each character in a set of characters to be segmented to generate a composite PDF for each pixel within the examining window;

(c) positioning the examining window over a portion of said field;

(d) obtaining a total value for the examining window by using each binary one pixel in the examining window and its associated composite PDF;

(e) moving said examining window relative to said field and repeating step (d) so as to obtain a peak or maximum total value for the examining window;

(f) using the maximum total value obtained from step (e) as an indication that the examining window contains image data associated with a character in the set of characters; and (g) repeating steps (c) through (e) for the remainder of the image data associated with said field.

When this invention is used in a processing system which presents a matrix of image data, with the matrix comprising rows and columns of binary pixels associated with a document having at least one field of characters thereon, it also provides a method of segmenting the binary pixels associated with a character included in said field, with the method comprising the steps:

(a) selecting an examining window whose size covers a predetermined number of rows and columns of the pixels associated with a character in the image data;

(b) calculating a probability density function, hereinafter referred to as PDF, for each pixel within the examining window for each character in a set of characters to be segmented to generate a composite PDF for each pixel within the examining window;

(c) positioning the examining window over a portion of said field;

(d) obtaining a total value for the examining window by using each binary one pixel in the examining window and its associated composite PDF;

(e) moving said examining window relative to said field and repeating step (d) so as to obtain a peak or maximum total value for the examining window;

(f) using the maximum total value obtained from step (e) as an indication that the examining window contains image data associated with a character in the set of characters;

(g) segmenting the image data which was included in the examining window when the maximum total value was obtained; and (h) repeating steps (c) through (g) for the remainder of the image data associated with said field.

The above advantages, and others, will be more readily understood in connection with the following specification, claims, and drawing.

DESCRIPTION OF THE PREFERRED EMBODIMENT

Figure 1:
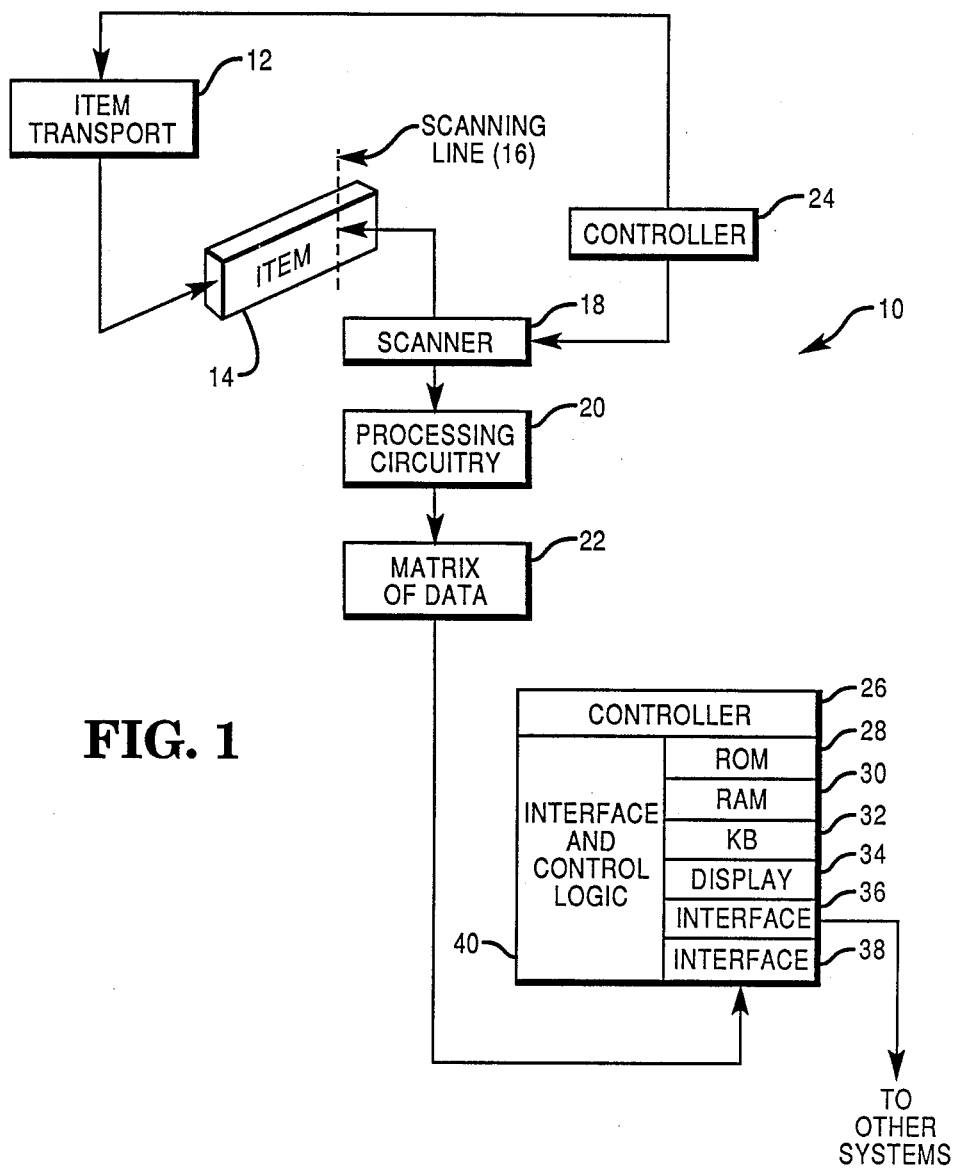
FIG. 1 is a general schematic diagram showing an apparatus which may be used in carrying out this invention.

As previous stated, this invention relates to a process for segmenting pixel data associated with a character from a matrix of pixel data in a multifont optical image system so as to enable the pixel data associated with a character to be singled out for use in subsequent operations, like character recognition, for example. In order to describe the process, it is useful to refer to FIG. 1 which shows apparatus 10 which may be used in carrying out the invention.

The apparatus 10 includes an item transport 12 which moves an item, like a document 14, towards a scanning line 16 where the document 14 is imaged by a scanner 18 as is conventionally done. The scanner 18 produces successive scan lines or columns of pixel data or pixels as the item 14 is moved in reading relationship therewith. The scanner 18 could also be a hand held scanner, for example, which is moved over a stationary document to effect the reading. From the scanner 18, the successive columns of pixel data are processed to minimize noise associated with the pixels and to threshold the pixels into a binary "1", for example, which may represent the presence of data and a binary "0" which represents the absence of data. This processing is effected by conventional circuitry shown only as processing circuitry 20. The output of the processing circuitry 20 is a matrix 22 of binary data or pixels (not compressed) which corresponds to the image of the associated document 14. The matrix 22 of data may include about 900 pixels per column with a resolution of 200 pixels per inch, for example. Naturally, the overall size of the matrix 22 of data is dependent upon a particular application; however, the particular size is not important to an understanding of this invention nor to the operation thereof. The scanner 18 and the item transport 12 may be controlled by a separate controller 24, for example, or they may controlled by the controller 26 which is used to process the matrix 22 of data or pixels.

The controller 26 (FIG. 1) is a conventional controller which may be used to process the matrix 22 of pixels according to this invention. The controller 26 includes a read only memory (ROM 28), a random access memory (RAM 30), a key board (KB) 32, a display 34, interfaces 36 and 38, and interface and control logic 40 which is used to interconnect all the components shown in a conventional manner. The form of the controller 26 shown is used to simply facilitate a discussion of the operation of the controller 26; the actual form of the controller 26 is different from that shown.

Before discussing, in detail, the individual steps used in the process of segmenting pixel data associated with a character according to this invention, it is useful to discuss some of the principles of operation of this process which will be designated generally as process 42.

As alluded to earlier herein, when one has a matrix of pixels which corresponds to the image of a document, like 14, for example, it is sometimes difficult to find out where in the matrix the particular information or data sought is located. For example, assume that the matrix 44 of pixels shown in FIG. 2 (similar to the matrix 22 of data shown in FIG. 1) corresponds to the image of a document 14. Assume, also, that the image data or pixels which are sought are located in field #1 and field #2. The entire image shown in FIG. 2 can be expressed as a number of columns of data and a number of rows of data or pixels which are either binary 1's or 0's in the example being described. For example, column 0 may start at the right side of the document 14, while column 600 approaches the left side of the document 14. Correspondingly, row 1 appears at the top of the document 14, while row 500 approaches the bottom of the document 14. Accordingly, the upper right hand corner of the matrix 44 (FIG. 2) corresponds to the upper right hand corner of the document 14 shown in FIG. 1. Naturally, the columns and rows may be reversed, depending upon how the documents are scanned, for example.

Figure 2:
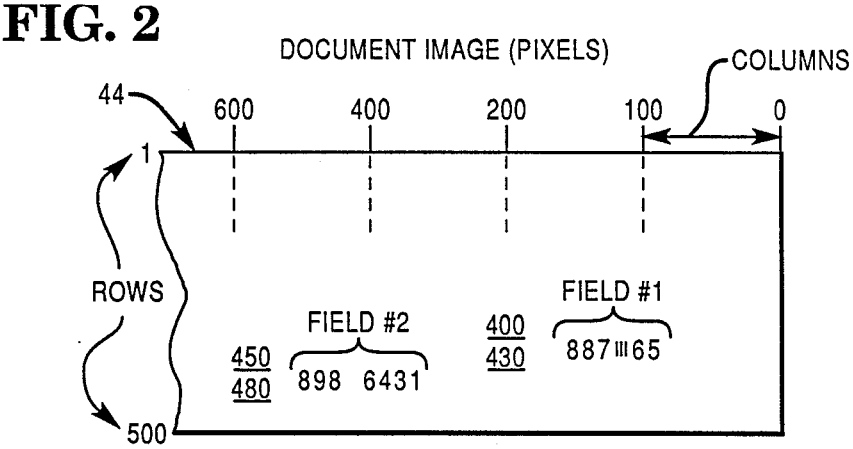
FIG. 2 is a schematic diagram showing a matrix of data.

The first general step in the process of finding the fields #1 and #2 shown in FIG. 2 is to process the pixels in the matrix 44 both vertically and horizontally. By examining the pixels in the matrix 44, the black pixels or binary 1 pixels associated with field #1 will be found to start at column 75 and end in column 175 in the example being described. When examining the pixels in the opposite or row direction, field #1 may be found to start at row #400 and end at row #430. Correspondingly, field #2 will be found to start at column 325 and end at column 525, and this field will also be found to extend from row 450 to row 480. This examination may be performed by the controller 26 in cooperation with a suitable software program residing in the associated ROM 28 or RAM 30.

The concept of the fields #1 and #2 discussed in relation to FIG. 2 is used to expedite the processing of the pixels included in a matrix 44 of pixels. If one knows the bandwidth or width of the field #1, for example, once the right-most edge (as viewed in FIG. 2) of this field is found, one can then extract the appropriate amount of columns of pixels for that field. In the example being described, the width of field #1 extends from column 75 to column 175. Naturally, the appropriate number of rows of pixels for the field would also be extracted. In the example described, field #1 extends between rows 400 and 430. Another point to be made here is that while the particular numbers shown in the fields #1 and #2 are shown in plain printing to facilitate a showing, the numbers would appear, actually, in the various fonts mentioned earlier herein.

Another concept which is used in the process 42 is referred to as a "super window". The super window is designed to cover or embrace the pixels associated with an individual character for the particular font being examined. For example, when characters are printed in the E13B font mentioned earlier herein, the character pitch for this font is 0.125 inch. The pitch is defined as the distance from the leading edge of one character to the leading edge of the next adjacent character. Assuming that the resolution of the associated scanner 18 (FIG. 1) is 200 pixels per inch, the resulting super window would have a width of 25 pixels (0.125×200). The actual height of a character printed in E13B font is 0.117 inch, consequently, the number of pixels included in the height of the super window is 24. Naturally, the number of pixels included in the super window is dependent upon the particular font selected and the resolution of the associated scanner 18 used. Also, fonts in addition to those mentioned may also be used with this invention. In other words, each font used has its own particular super window.

Figure 3:
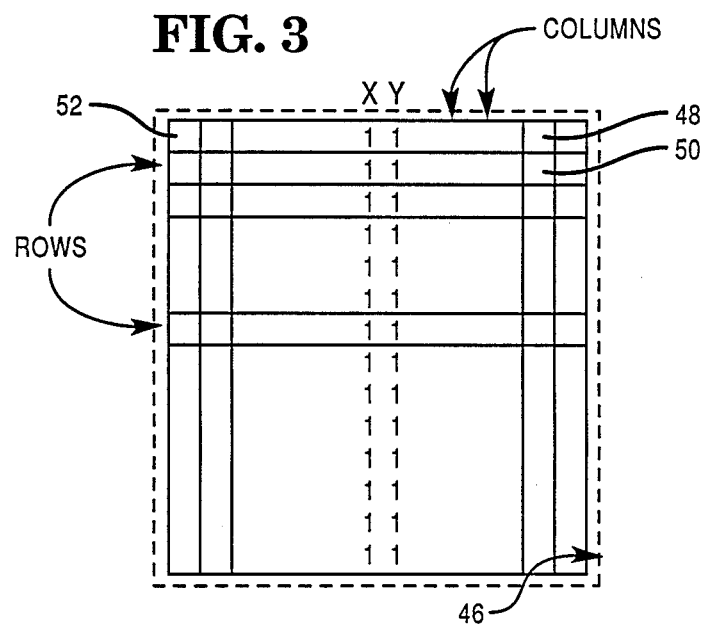
FIG. 3 is a schematic diagram showing a "super window" used in carrying out this invention.

An examining window or super window 46 is shown generically in FIG. 3, with the vertical columns corresponding to the scanning line 16 shown in FIG. 1 and with the squares 48 and 50 corresponding to thresholded binary data representing pixels in a scanning line 16.

A feature of this invention is that neural network technology or conventional techniques may be used to obtain a statistically evenly distributed Probability Density Function (PDF) for each pixel located in the super window 46 for a whole set of characters included in the particular font selected. The import of the previous statement will become clearer with an example as to how it is derived.

As an example, the super window 46 has to be "trained" to enable the process 42 to perform the segmentation alluded to earlier herein. The training process may begin with a known character being submitted to the super window 46. In this regard, the number 1 may be presented to the window 46 as shown in FIG. 3. To simplify the discussion, assume that the number 1 is simple in design in that it extends over only two columns, namely columns X and Y. Naturally, when the number 1 is printed in the particular font selected, the number 1 may extend over more than the two columns mentioned. The binary pixel data for this example would include binary 1's in the X and Y columns, with binary 0's existing in all the remaining columns in the super window 46. Only the binary 1's are shown in FIG. 3 to simplify the showing thereof. The controller 26, through its associated software stored in the RAM 30, for example, then keeps a tally or count of the binary 1's located in each one of the row and column positions of the super window 46.

Continuing with the training process mentioned, a second sample of the number 1 is presented to the super window 46. Again, a tally or count is kept of all binary 1's which exist in the super window 46 for the various row and column positions included therein. Again, assume that all the binary 1's appear in the X and Y columns, resulting in a total of 2 being included for each of the row positions for the X and Y columns. Assume that this same process is repeated for eight more samples, making a total of 10 samples taken. This means that each one of the row positions for columns X and Y would have a count of 10 therein. These counts mentioned are stored in the RAM 30 of the controller 26 at positions therein which indicate the associated row and column positions for all the pixels within the super window 46. A shorthand expression for indicating what has been obtained is to say that a two dimensional array of weights has been obtained for the number 1 in the particular font selected.

The process just described in the previous paragraph is repeated for all the characters in the particular font selected. In other words, 10 samples are obtained for the numeral "2", numeral "3", etc., for all the characters in the particular set of characters to be subjected to segmentation. In effect, each character included in the font will have its own two dimensional array of weights (counting binary ones) calculated for it. All of the arrays of weights calculated for each character in the set are then added together by row and column positions to end up with composite totals for each pixel position within the super window 46. The composite totals could also be considered a total weighted value. For example, if the pixel 52 in the upper left hand corner of the super window 46 never had a binary 1 in it for any of the characters included in the particular font being discussed, then the probability that this pixel position will be set to a binary 1 by an E13B character is zero. The higher the weight or the count for a particular pixel position, the higher is the probability that this particular pixel will be set to a binary one when a character from the associated font is encountered by the super window 46. In one embodiment, the super window has a size of 20 pixels wide by 24 pixels high (as viewed in FIG. 3) making a matrix of 480 pixels.

Figure 4:
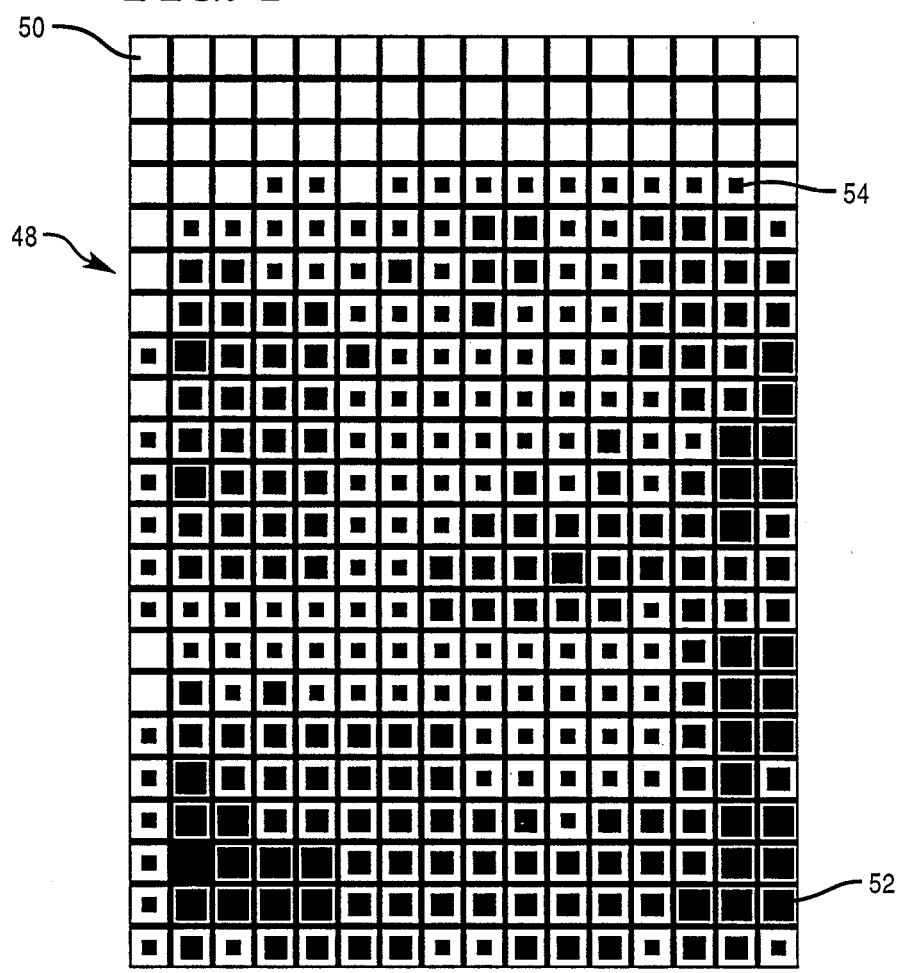
FIG. 4 is a schematic diagram showing the probability density function (PDF) for each of the pixels in an examining window for a set of characters in a particular style or font, with the size of the black square (if any) within a pixel representing that pixel's PDF.

FIG. 4 shows another embodiment in which the super window 48 has a size which is 16 pixels wide and 22 pixels high, with the weights for the individual pixels being shown for the entire character set. The weights are shown by the sizes of the black squares (if any) within the pixel areas. For example, pixel 50 which is completely white means that the PDF for this pixel is zero. Pixel 52 which is entirely black represents a very high PDF for this pixel for the particular font which was obtained by the process discussed in relation to FIG. 3. The pixel 54 represents a small, but existent PDF.

After the super window 46 has been trained as described, additional steps in the process 42 can be utilized. The matrix of data 22 (FIG. 1) for a particular document 14 may be stored in the RAM 30 of the controller 26 as previously described. When the matrix 22 of data for a particular document 14 is to be worked upon, it is withdrawn from the RAM 30 and examined to locate the fields #1 and #2 as previously described in general.

Figures 6, 7, 8:
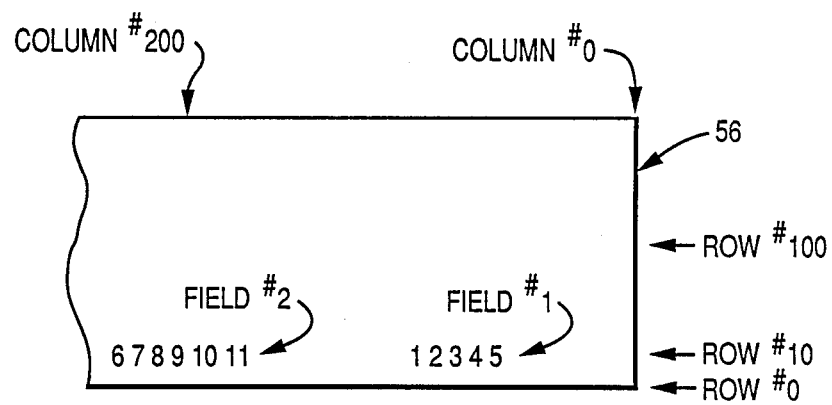
FIG. 6 is a schematic diagram showing a matrix of binary data associated with a document.
FIG. 7 is a table showing the start and stop rows and the start and stop columns associated with certain fields of the matrix of data shown in FIG. 6 as determined in an ideal environment.
FIG. 8 is a table similar to that shown in FIG. 7; however, the values shown are what might be expected in a noisy environment.

FIG. 6 shows a matrix of data for a document, with the matrix being designated as 56, and with the data consisting of binary ones and zeros as previously described. Only the data related to fields #1 and #2 is shown in FIG. 6 to simplify the drawing; however, the exact locations of the fields of data are not known as previously discussed. For this matrix 56 of data, the starting rows of data appear at the bottom of the document instead of appearing at the top of the document as discussed in relation to FIG. 2.

Figure 5:
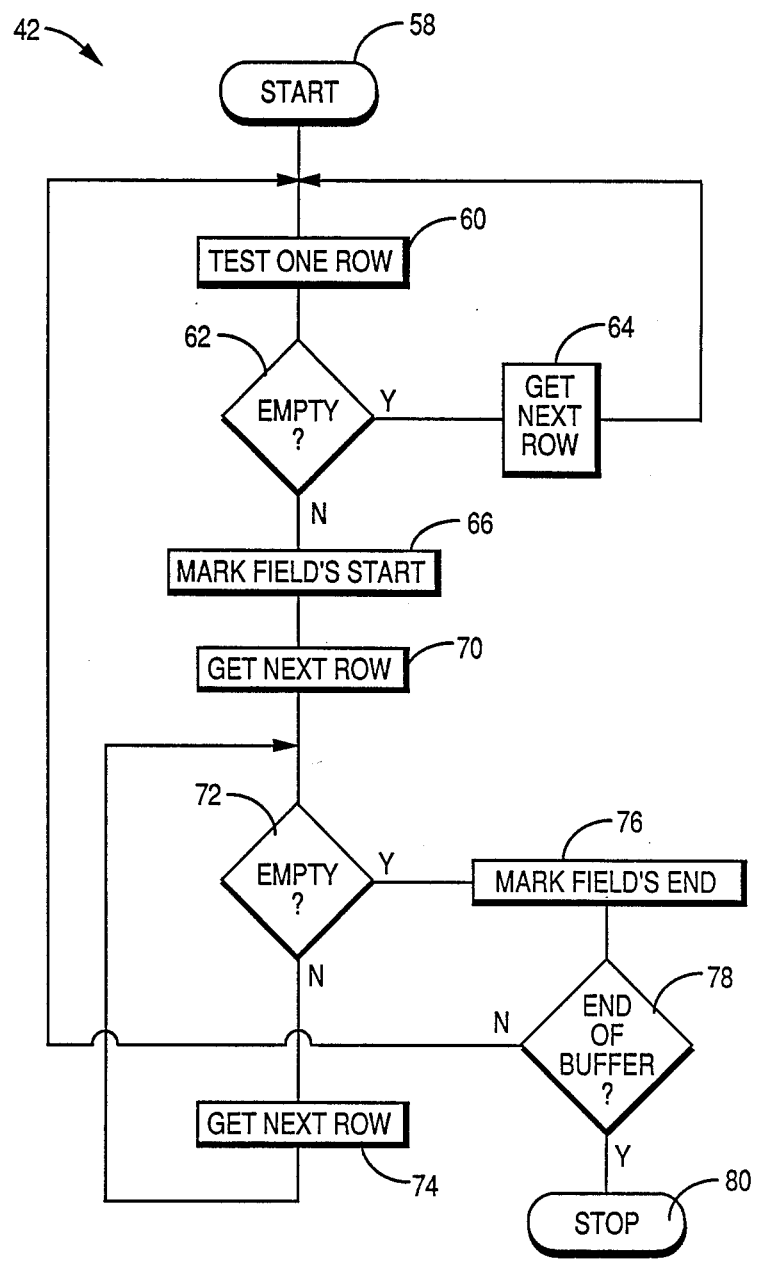
FIG. 5 is a flow chart showing a process for locating data fields when examining the rows of pixel data in a matrix of data for a document.

Part of the process 42 includes scanning or examining the matrix 56 (FIG. 6) of data by the process shown in FIG. 5 to locate certain areas or fields of data on the document. For example, field #1 may be the monetary amount of the document, while field #2 relates to certain bank and customer account codes for example. It should be noted that in the U.S.A., for example, the fields #1 and #2 are printed in magnetic ink in E13B font on the document itself; however, the imaging and character recognition techniques mentioned herein relate to optical processing of data.

To continue with the processing of data associated with the image data shown in FIG. 6, the process 42 includes the scanning of the image data in a horizontal direction as shown in FIG. 5. As previously stated, the matrix 56 of image data data is stored in the RAM 30 of the controller 26, and a software routine stored in the RAM 30, for example, may be used to process the data as shown in FIG. 5.

The processing or scanning of the matrix 56 of data is done to determine the limits or the start row and the stop row of the data associated with the fields #1 and #1 shown in FIG. 6. In this regard, the process 42 (FIG. 5) includes the start step shown by block 58. Basically, the process 42 scans the matrix 56 of data by testing one row at a time by looking for a binary "1" in that row; this is shown by block 60. An empty row is one which does not have a binary 1 in it. If the row is empty (block 62), the process 42 gets the next row of data (block 64) and again looks for a binary 1 in that row. In the process being described, the scanning is done from the bottom row shown in FIG. 6 and proceeds towards the top row shown therein. When a binary 1 is found in a particular row, that row is marked as the start row of the field as represented by block 66. This start row is also recorded in a table 68 shown in FIG. 7, with the table 68 also being stored in the RAM 30. For illustrative purposes, assume that the field #1 starts at row 8.

The process 42 (FIG. 5) continues to examine the next row as indicated by block 70. Most likely, this next row contains a binary 1 therein; therefore, this row is not "empty" as represented by block 72. At this point, it is most likely that the height of at least one character is being encountered. Consequently, the next row is obtained (block 74), and this process is repeated until a binary 1 is not found in a row, indicating that that row is empty (block 72) and also indicating the end of a field as represented by block 76. The end of the field or the stop row is then noted in table 68; assume that the stop row is 28 as shown in FIG. 7. If this row 28, for example, is not the last row in the buffer or RAM 30 for the associated matrix 56 of data as queried at block 78, the process is repeated, starting at the testing step shown as block 60. If the row 28 is the last row in the matrix 56 of data, the process stops as indicated at block 80.

A logical concern at this time relates to how start and stop rows are determined for different fields which may have overlapping portions in certain rows. In this regard, if more than one field of data is expected on a document as is shown in FIG. 6, it is better to search for the start and stop columns of the fields #1 and #2 prior to searching for the associated start and stop rows of these fields. By knowing the start and stop columns for field #1, for example, only row data which is between these start and stop columns may be considered in determining the start and stop rows for this field.

Figure 9:
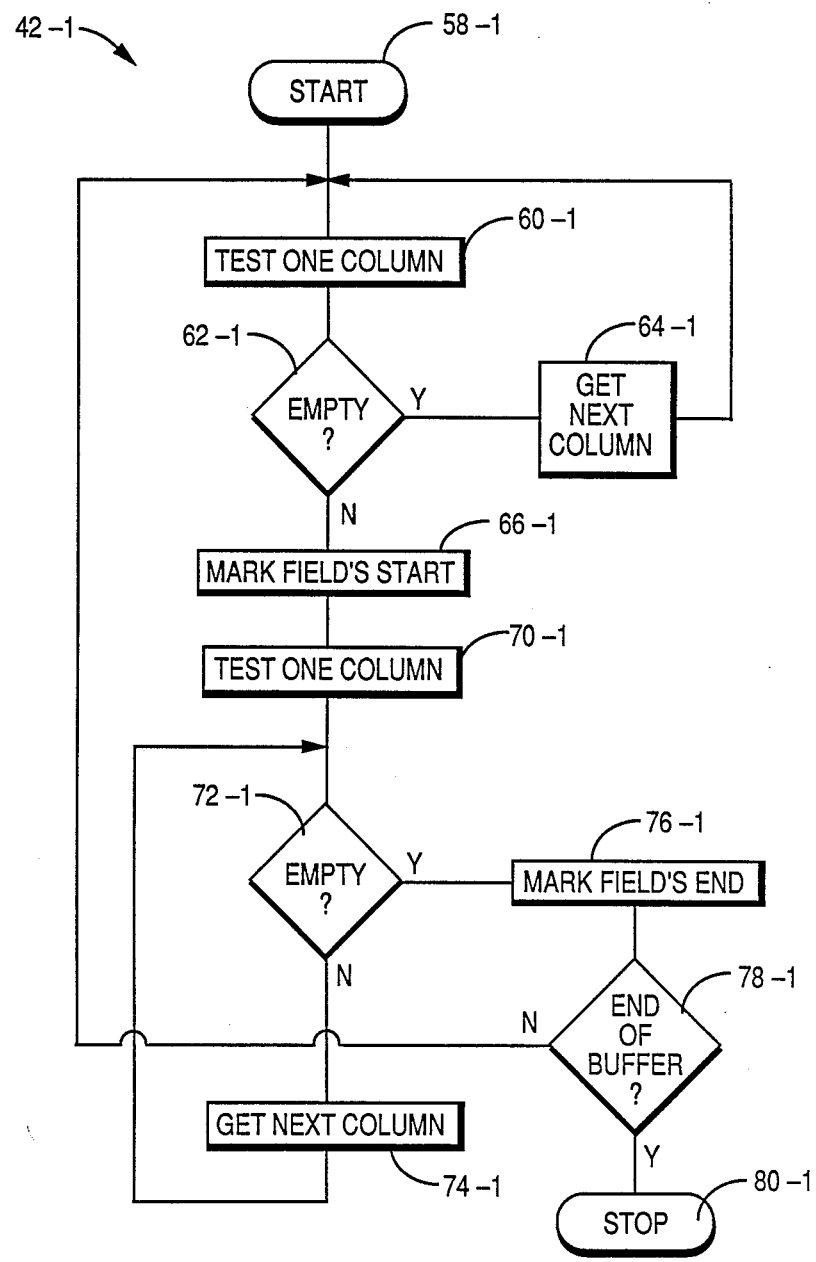
FIG. 9 is a flow chart showing a process for locating data fields when examining the columns of data in a matrix of data for a document.

The searching for data associated with the fields shown in FIG. 6 when searching in a vertical direction is shown by the process 42-1 shown in FIG. 9. The process 42-1 for searching in a vertical direction is identical to the process 42 for searching in a horizontal direction already described. Consequently, the individual steps shown in FIG. 9 are represented by individual blocks whose numbers correspond to the blocks shown in FIG. 5; however the blocks shown in FIG. 9 are given a (−1) suffix. For example, the testing step for rows represented by block 60 in FIG. 5 corresponds to the testing step for columns represented by step 60-1 in FIG. 9.

The values received from running the process 42-1 (FIG. 9) are stored in the table 68 shown in FIG. 7. As an illustration, the start column for field #1 may be 20, and the stop column for this field may be 120. Correspondingly, the start row and stop row for field #2 may be 4 and 22, respectively, with the start and stop columns being 200 and 600. The values shown in table 68 are simply illustrative values in an ideal environment, where there is no noise, for example.

FIG. 8 is a table 82, showing some illustrative values for field #1 when the values for the start and stop rows were obtained in a noisy environment. "Noise" may due to ink spatter or background data on the check 14, for example. Notice from table 82 that there is a start row at row 1 and a stop row at row 2, and there is also a second grouping of start and stop rows at rows 8 and 28, respectively. The controller 26 knows what the anticipated heights of the fields #1 and #2 are, and consequently, it will reject the start and stop data associated with rows 1 and 2 as noise and accept the start and stop rows 8 and 28 as valid data. The same is true for rejecting data as noise when scanning the columns because the controller also knows the width of the fields to be encountered.

After the extremities of start and stop rows and columns are obtained for the various fields in a particular matrix 56 of data as described, the next step in the process 42 is to start using the super window 46 already discussed in relation to FIG. 3. As previously mentioned, the size of the super window 46 reflects the resolution of the scanner 18 and the actual size of the pitch and the height for a character in the particular font being examined in a field. The field #1, already discussed in relation to FIGS. 6, 7, and 8, is shown in an enlarged form in FIG. 10. The controller 26 has the start and stop rows and columns associated with field #1 in its RAM 30, and this image data is extracted to be processed with regard to the super window 46.

Figure 10:
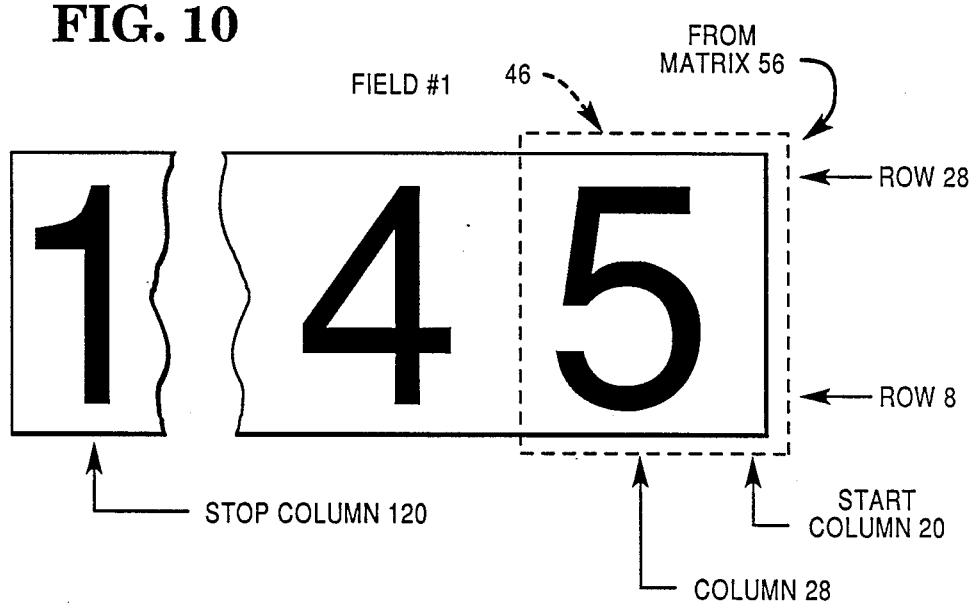
FIG. 10 is a schematic diagram showing the super window positioned over a portion of the field of characters included in the matrix of data.

The super window 46 is positioned relative to the field #1 shown in FIG. 10 so that the vertical midpoint of the examining or super window 46 is positioned a few columns before the midpoint of the pitch for the character when proceeding in an examining direction, or from the right side of the field towards the left side as viewed in FIG. 10. For example, assume that the super window 46 has a size which is 20 pixels wide and 24 pixels high, and the pitch of the particular font being segmented is 20 pixels wide. With this example, the vertical center of the super window 46 is positioned at column 28 which is 8 columns from the start column 20 as shown in FIG. 10.

With the super window 46 so positioned as shown in FIG. 10, the controller 24 adds up the informational content of the super window 46 to arrive at a sum for that window position. In other words, there are 20×24 or 480 pixels in the super window in the example being described. It should be recalled that each one of the pixels in the super window 46 has its associated composite PDF which was obtained earlier as described in training the super window 46. Each one of the 480 pixels is examined to determine whether it is a binary one or zero. For each pixel which is a binary 1, the controller 26 adds its associated PDF to obtain a total window value (TWV) or window total for that particular window position which is column 28 in the example being described. Or the TWV may be obtained by multiplying a binary 1 found in the super window 46 by its composite or associated PDF and adding together the resulting values. As an illustration, the window total may be 280 in the example being described. The controller 26 then moves the super window 46 to obtain the window total when the super window 46 is positioned at column 29; at this position, the window total may be 330. Correspondingly, when the super window 46 is moved to column 30, the window total may be 310. Notice that the maximum or peak window total was obtained when the super window 46 was positioned at column 29 in the example being described. This means that the super window 46 is most accurately positioned relative to the first character in the field #1 when the vertical center of the examining window 46 was positioned at column 29.

After locating the image data associated with the first character in the field #1 in the example being described, the controller 26 then extracts all the pixels which were included in the super window 46 when this window was vertically centered at column 29; these pixels within the super window 46 comprise a first character matrix of pixels. This first character matrix of pixels which was just segmented from the field #1 is then stored in the RAM 30 for later subjection to character recognition techniques, or it may processed for character recognition for "on line" processing.

The location of the image data associated with the second character in the field #1 (FIG. 10) in the example being described is as follows. Because the vertical center of the first character matrix of pixels is located at column 29, and because the pitch of the font being discussed is 20, the controller 26 then moves the super window 46 to position or center it at column 48. The location at column 48 is derived by adding the character pitch (20 columns) to the location of the vertical center of the prior character (column 29), and backing off a column (−1 column) to enable the controller 26 to check for a peak total as was done in locating the vertical center of the first character matrix of data. With the center of the super window 46 being positioned at column 48, the controller 26 then calculates a total for the pixels included in this window. When a peak is found by shifting the super window 46 to the left, as previously described, the pixels which are included in the window are extracted as representing the matrix of pixels for the second character in field #1. This process is repeated for the remaining characters in field #2. It should be noted that at the time when the super window 46 is centered over the matrix of pixels representing a character, the actual identification of the character is not known; it is simply segmented from its associated field to facilitate character recognition.

What is claimed is:

1. In a processing system which presents a matrix of image data, with the matrix comprising rows and columns of binary pixels associated with a document having at least one field of characters thereon, a method of finding the binary pixels associated with a character included in said field comprising the steps:
   (a) selecting an examining window whose size covers a predetermined number of rows and columns of the pixels associated with a character in the image data;
   (b) calculating a probability density function, hereinafter referred to as PDF, for each pixel within the examining window for each character in a set of characters to be segmented to generate a composite PDF for each pixel within the examining window;
   (c) positioning the examining window over a portion of said field;
   (d) obtaining a total value for the examining window by using each binary one pixel in the examining window and its associated composite PDF;
   (e) moving said examining window relative to said field and repeating step (d) so as to obtain a peak or maximum total value for the examining window;
   (f) using the maximum total value obtained from step (e) as an indication that the examining window contains image data associated with a character in the set of characters; and
   (g) repeating steps (c) through (e) for the remainder of the image data associated with said field.

2. The method as claimed in claim 1 in which said moving step (e) is used for substantially centering the image data associated with a character within the examining window.

3. In a processing system which presents a matrix of image data, with the matrix comprising rows and columns of binary pixels associated with a document having at least one field of characters thereon, a method of segmenting the binary pixels associated with a character included in said field comprising the steps:
   (a) selecting an examining window whose size covers a predetermined number of rows and columns of the pixels associated with a character in the image data;
   (b) calculating a probability density function, hereinafter referred to as PDF, for each pixel within the examining window for each character in a set of characters to be segmented to generate a composite PDF for each pixel within the examining window;
   (c) positioning the examining window over a portion of said field;
   (d) obtaining a total value for the examining window by using each binary one pixel in the examining window and its associated composite PDF;
   (e) moving said examining window relative to said field and repeating step (d) so as to obtain a peak or maximum total value for the examining window;
   (f) using the maximum total value obtained from step (e) as an indication that the examining window contains image data associated with a character in the set of characters;
   (g) segmenting the image data which was included in the examining window when the maximum total value was obtained; and
   (h) repeating steps (c) through (g) for the remainder of the image data associated with said field.

4. The method as claimed in claim 3 in which said selecting step (a) is effected by utilizing the pitch of the set of characters.

5. The method as claimed in claim 4 in which said positioning step is effected by utilizing the pitch of the set of characters.

6. The method as claimed in claim 3 in which said obtaining step (d) is effected by multiplying each binary one pixel in the examining window by its associated composite PDF.

7. The method as claimed in claim 3 in which said obtaining step (d) is effected by adding up the associated composite PDF for each binary one pixel in the examining window.

8. In a processing system which presents a matrix of image data, with the matrix comprising rows and columns of binary pixels associated with a document having at least one field of characters thereon, a method of segmenting the binary pixels associated with a character included in said field, comprising the steps:

(a) selecting an examining window whose size covers a predetermined number of rows and columns of the pixels associated with a character in the image data;

(b) presenting image data for a known character in a set of characters to the examining window, with a binary one pixel representing the presence of data and a binary zero pixel representing the absence of data;

(c) storing the binary one and zero pixels in a memory according to row and column positions in the examining window for the known character from the presenting step (b);

(d) repeating the presenting step (b) and the storing step (c) a predetermined number of times for the same known character so as to obtain a probability density function, hereinafter referred to as PDF, for each pixel in the examining window for the known character being presented;

(e) storing the PDF for each pixel in the examining window for the known character being presented;

(f) obtaining and storing according to steps (c) through (e) the PDFs for each pixel in the examining window for the remaining characters in a set of characters to be segmented;

(g) summing the PDFs for each pixel in the examining window for all the characters in the set of characters so as to arrive at a total weighted value (hereinafter referred to as TWV) for each pixel in the examining window for the set of characters;

(h) positioning the examining window over a portion of the matrix of image data including said field of characters;

(i) obtaining a total value for the examining window by using each binary one pixel in the examining window and its associated TWV;

(j) moving the examining window relative to the field so as to obtain a peak or maximum total value for the examining window;

(k) using the maximum total value obtained from step (j) as an indication that the examining window contains image data associated with a character in the set of characters; and (l) segmenting the image data which was included in the examining window when the maximum total value was obtained.

9. The method as claimed in claim 8 in which said selecting step (a) is effected by utilizing the pitch of the set of characters.

10. The method as claimed in claim 8 in which said positioning step (h) is effected by utilizing the pitch of the set of characters.

11. The method as claimed in claim 8 in which said obtaining step (i) is effected by multiplying each binary one pixel in the examining window by its associated TWV.

12. The method as claimed in claim 8 in which said obtaining step (i) is effected by adding up the associated TWV for each binary one pixel in the examining window.

13. The method as claimed in claim 12 is which said positioning step (h) is effected by first searching for the rows and columns in which said field is located so as to provide the location of said field of said field within said matrix of image data.

* * * * *